United States Patent [19]

Penn et al.

[11] 4,341,972

[45] Jul. 27, 1982

[54] DYNAMOELECTRIC MACHINE COMMUTATOR STRUCTURE AND METHOD OF MAKING SAME

[75] Inventors: William B. Penn; Martin A. Zgraggen, both of Erie, Pa.

[73] Assignee: General Electric Co., Schenectady, N.Y.

[21] Appl. No.: 244,586

[22] Filed: Mar. 17, 1981

[51] Int. Cl.³ ...................... H02K 23/38; B65H 81/00

[52] U.S. Cl. .................................... 310/233; 310/235; 156/162; 29/597; 29/733

[58] Field of Search ................... 310/43, 45, 233, 235, 310/236; 29/597, 733; 156/162, 164

[56] References Cited

U.S. PATENT DOCUMENTS 3,146,364 8/1964 Paul .................................... 310/236

3,751,700 8/1973 Cole .................................... 310/235

4,170,505 10/1979 Zgraggen ............................ 156/162

FOREIGN PATENT DOCUMENTS 145587 9/1979 German Democratic Rep. ... 29/597

*Primary Examiner*—J. D. Miller

*Assistant Examiner*—D. L. Rebsch

*Attorney, Agent, or Firm*—Vale P. Myles

[57] ABSTRACT

A dynamoelectric machine commutator structure having a plurality of conductive commutator segments secured in operating position by a commutator banding is characterized by including a flexible, thermally stable dielectric coating material between the outer edges of the commutator banding and the conductor segments in order to effectively seal the junction between those members, thereby preventing the deposit or buildup of electrically conductive contaminants at that junction so that the likelihood of electrically short circuiting the conductive segments of the commutator is effectively eliminated. According to the preferred method of the invention, a banded commutator is formed by applying such a coating to predetermined portions of the banding grooves so that the coating effectively seals the junctions between the banding and the conductive segments of the commutator, thereby preventing the accumulation of conductive contaminants at those junctions. In one embodiment a release layer is provided on the side of the coating facing the commutator banding in order to establish the junction between the banding and the release layer as the most preferred site of any contaminant-collecting fissures that may be created by relative movement between the banding and the commutator segments.

7 Claims, 5 Drawing Figures

DYNAMOELECTRIC MACHINE COMMUTATOR STRUCTURE AND METHOD OF MAKING SAME

BACKGROUND OF THE INVENTION

The invention relates to dynamoelectric machine commutator structures and more particularly to improvements in such structures whereby effective seals are provided at the junctions of commutator banding means and commutator conductor segments for the purpose of preventing the build-up of conductive contaminants in fissures formed between those members by thermocycling and other forces causing relative movement of those members during commutator operation.

At the present time it is generally well known in the manufacture of commutator structures for dynamoelectric machines to utilize pre-stressed glass bands, or other suitable commutator banding materials, mounted in pre-formed annular grooves on a commutator surface to provide an effective means for securing conductive commutator segments rigidly in position against the relatively high centrifugal forces exerted on them during rotation of the commutator. For example, U.S. Pat. No. 4,170,505 which issued on Oct. 9, 1979 and is assigned to the assignee of the present invention, discloses a glass banded commutator structure and a method for making it by utilizing an irradiation curable resin to lock glass bandings in operating position on the commutator.

It was also known well before the present invention that conductive commutator segments could be adhesively bonded successfully to a supporting hub or base member. Such an adhesively bonded commutator structure is shown in U.S. Pat. No. 3,751,700, which issued Aug. 7, 1973 and is also assigned to the assignee of the present invention. In practicing the types of commutator binding or banding operations described in the foregoing two patents as well as those otherwise generally in use at the present time, a variety of different banding materials have been proven suitable for such applications. For example, as mentioned in U.S. Pat. No. 3,146,364 which issued Aug. 25, 1964, a commutator banding or tape may be suitably formed of resin-impregnated roving comprising fiberglass or other non-conducting fibers such as those sold under the trade names "nylon" and "Dacron." As is illustrated by the methods described in each of the foregoing patents, the more recent commutator banding methods known in the prior art typically require a resin impregnated banding tape or roving to be wound directly into a suitable annular channel or groove in the outer circumferential surface of a commutator. The ease with which such bands are quickly and effectively positioned on a commutator, coupled with the effectiveness of those bands in rigidly securing the commutator segments in operating position against the forces tending to move the commutator bars when the commutator is rotated at high speed, have caused such banding techniques to be widely adopted. Moreover, because the banding tapes and associated resins are usually both dielectric in nature, it was not, prior to the present invention, believed to be either necessary or desirable to provide any particular insulation or other coatings between the commutator bands and the commutator conductive segments.

However, the inventors of the invention described herein have discovered that during the normal operation of a commutator that is banded with known prior art methods, such as those described in the above mentioned patents, it is possible in frequently encountered commutator operating conditions for electrically conductive contaminants to be deposited in cracks and fissures between the commutator bands and the adjacent commutator conductive segments. In the event that a sufficient thickness of conductive contaminants is so deposited, it is possible that electrical tracking will occur over the deposits, between adjacent conductor segments, thereby resulting in carbon buildup that eventually creates a sufficient current path to short circuit the commutator.

Normal thermal cycling and mechanical forces applied to a commutator as a consequence of its operation may be sufficient to create enough relative movement between commutator bands and associated commutator segments, to cause cracks and fissures at the junction of these members. Once such fissures are formed, they readily collect deposits of carbon dust and other electrically conductive contaminants that are often present in the operating ambient. Many of these deposits can lead to the undesirable type of commutator bar shorting just described. In addition, and in the absence of such fissures, it is possible that adjacent commutator segments can be short circuited due to the buildup of moisture or carbon dust on the surface of a commutator banding material. Such undesirable buildup of contaminants on the banding surfaces can easily bridge the mica or other insulating materials that are disposed between adjacent commutator conductor segments, thereby producing a tracking or arcing path which causes further carbonization of the underlying bonding resin in the glass bands. That kind of carbonization will eventually short circuit the commutator segments as well as cause degradation of the banding material to such an extent that it may fail to perform its desired clamping function.

OBJECTS OF THE INVENTION

A primary object of the invention is to provide a commutator structure and a method of manufacturing such a structure that is effective to avoid or overcome the above-noted disadvantages of presently known commutator banding structures and methods of banding commutators.

Another object of the invention is to provide a banded commutator structure including an improvement whereby electrical tracking and arcing along the surface of the commutator banding between adjacent commutator conductor segments, is effectively prevented.

A further object of the invention is to provide a method of manufacturing a banded commutator structure whereby a commutator banding is applied to a commutator in a manner that obviates the risk of electrical tracking by avoiding the deposit of contaminants between the commutator banding and adjacent commutator conductor segments.

Yet another object of the invention is to provide a commutator structure having a coating of flexible, thermally stable, dielectric material positioned between the commutator bands and adjacent conductor segments of the commutator thereby to seal the junctions between the bands and those members against the deposit therein of electrically conductive contaminants.

A still further object of the invention is to provide a commutator structure and method for making same whereby a flexible coating material having a release layer applied to one side thereof is disposed between a commutator band and adjacent commutator conductive segments so that the release layer is juxtaposed with the commutator band, thereby to cause any fissures or cracks formed between the band and the commutator segments to form between the band and the side of the flexible coating having the release layer on it, rather than to form between the flexible coating material and the conductor segments.

Additional objects and advantages of the invention will become apparent to those skilled in the art from the description of it presented herein, considered in conjunction with the accompanying drawings.

SUMMARY OF THE INVENTION

In one preferred form of the invention a banded commutator structure is manufactured with a coating of flexible, thermally stable dielectric material adhered to the side walls of an annular groove that holds the commutator banding against axial movement on the commutator. The coating of flexible material is effective to completely seal the junction between the commutator banding material and the adjacent commutator segments against any deposit of electrically conductive contaminants in fissures or cracks that might be created at that junction by relative movement between the banding and the commutator segments. In an alternative form of the invention a release layer of material is provided between the commutator banding and the coated commutator conductive segments so that relative movement between the segments and the banding will most probably result in the formation of any resultant cracks or fissures at the release layer, rather than between the conductive commutator segments and the flexible coating of thermally stable dielectric material bonded to the segments.

In the method of the invention a banded commutator structure is formed by positioning a coating of flexible, thermally stable dielectric material between a commutator band and associated conductive commutator segments in order to prevent the deposit of electrically conductive contaminants between those members. The coating of sealant is cured in place and remains flexible at normal operating temperatures of the commutator. In a modification of the most preferred method of the invention, a layer of release material is provided between the conductor band and the coating of flexible material bonded to the commutator segment thereby to cause any cracks or fissures formed between those members to be most likely formed at the release layer, rather than to be formed between the conductive coating and the commutator segments.

BRIEF DESCRIPTION OF THE PREFERRED EMBODIMENTS

Figure 1:
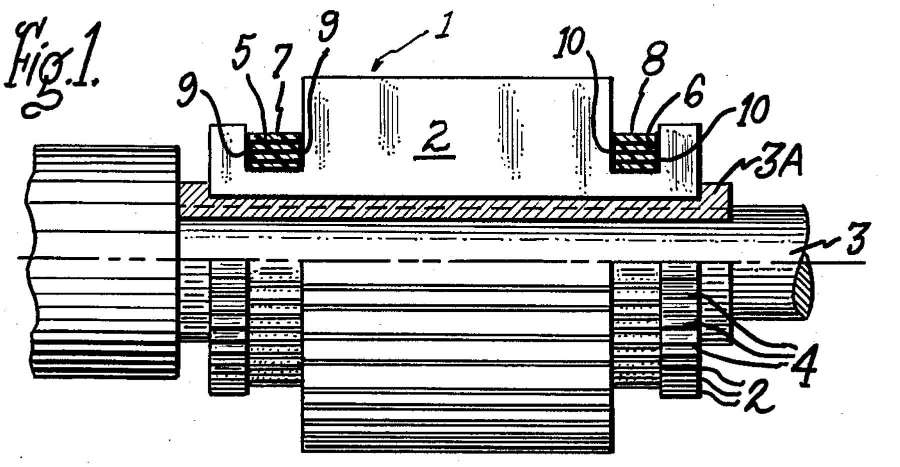
FIG. 1 is a side elevation view, partly in cross-section, of a commutator structure constructed according to the invention and illustrated relative to a supporting hub or shaft.

Referring now to FIG. 1 of the drawing, there is shown a dynamoelectric machine commutator structure 1 that is depicted with an upper quadrant removed to expose a cross-section of the commutator bands. The commutator includes a plurality of conductive commutator segments 2 that are mounted in a conventional manner in a generally cylindric array on a hub member in the form of a steel shaft 3. A dielectric sleeve 3A formed of any suitable well-known insulating material is positioned between the shaft 3 and the respective radially-innermost surfaces of each of the conductive commutator bars 2, in a well-known manner.

The commutator segments 2 are each electrically insulated from one another by sheets of mica or other suitable insulating material 4 disposed, respectively, between the commutator bars 2. Also, the insulating sleeve 3A electrically isolates the commutator conductive segments from the hub member or shaft 3. In order to secure the commutator segments 2 against radial outward movement responsive to centrifugal and other mechanical forces that occur during normal operation of the commutator and supporting hub member two annular grooves 5 and 6 are defined in the outer cylindrical surface of the array of commutator segments 2 for receiving, respectively, therein commutator securing bands 7 and 8.

As mentioned at the outset above, various materials can be used for forming the commutator bands 7 and 8, but for the purpose of describing this invention a glass banding tape and associated irradiation curable bonding resin similar to that described in the aforementioned U.S. Pat. No. 4,170,505 is used to form the commutator bands 7 and 8. Accordingly, the bands 7 and 8 are effective to continuously apply a radially inward force to the commutator segments 2 in order to secure them against movement responsive to centrifugal force during operation of the commutator.

Although two commutator bands 7 and 8 are shown in the embodiment of the invention being described, it will be understood that in alternative embodiments a greater number of such bands can be employed and in any event, at least one such band will be employed in practicing alternative forms of the invention disclosed herein. The commutator structure 1 is characterized according to the present invention by incorporating the improvement comprising a coating of flexible, thermally stable and electrical-track resistant material 9 and 10 mounted on and adhered to the side walls of the respective grooves 5 and 6 and at least the edges of the radially outer surfaces of the respective commutator bands 7 and 8.

Figure 2:
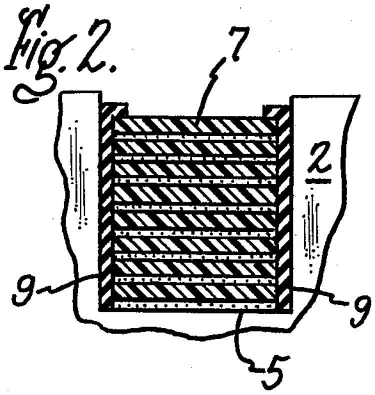
FIG. 2 is a side elevation view of a fragment of the commutator shown in FIG. 1, in enlarged scale, illustrating one preferred form of an improved commutator structure that includes means for preventing the deposit of conductive contaminants between the illustrated commutator band and adjacent conductive commutator segments.

In order to more clearly illustrate this important feature of the invention, there is shown in FIG. 2 an enlarged view of the commutator groove 5 including a fragmentary portion of one of the conductor segments 2 and a cross-sectional view of the commutator banding 7 as they are positioned in relation to the flexible coatings 9 described above. The function of the coatings 9 is to completely seal the junctions between the radially outer edge surfaces of the banding 7 and the adjacent commutator segments 2. (Similarly, coatings 10 form seals at the junction at the edges of the like banding 8 and each of the adjacent commutator segments 2, thereby to prevent electrically conductive contaminants such as carbon or metal dust and moisture from collecting in those junctions where they could promote the occurrence of electrical tracking or arcing between the commutator segments.)

To accomplish this function according to the invention, we found that it is necessary to use a coating material that is sufficiently flexible and thermally stable to fully accommodate the relative movement that inevitably occurs between the commutator banding 7 and the commutator segments 2 during operation of the commutator. Various commercially available resins have been found to be suitable for this purpose. However, in the preferred embodiment of the invention, the coating material 9 (and 10) is a room temperature curable fluoroelastomer compound consisting essentially of 100 parts by weight (pbw) fluoroelastomer gum, 15 pbw magnesium oxide, 1 pbw triethylene tetramine and 348 pbw methyl ethyl ketone. Suitable fluoroelastomer materials having these properties are commercially available from E.I. DuPont DeNemours Co. of Wilmington, Del., under the trade name Viton, or from 3M Company under the trade name Fluorel, or from Chemical Coatings and Engineering Company, of Media, Pa., under a compounding code number PC-12E or SP-V12. Those skilled in the art will recognize that various pigment and leveling agents may also be incorporated in the basic compound solution, as desired, without destroying the necessary properties of flexibility, thermal stability and high dielectric levels. In addition, it should be understood that methyl isobutyl ketone can be used to replace some of the methyl ethyl ketone in the foregoing generic compound of the invention, in order to show the drying rate, as desired.

A preferred method for applying the coating material 9 to the side walls of the groove 5 will be described in greater detail below, but now reference is made to FIGS. 3 and 4 of the drawing to describe alternative forms of the commutator structure of the invention.

Figure 3:
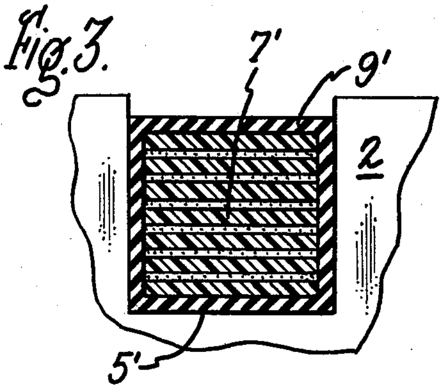
FIG. 3 is another side elevation of a fragment of a modified form of the commutator shown in FIG. 1, illustrating an alternative form of the improved commutator structure provided by the invention.

As shown in FIG. 3, another fragmentary portion of a commutator segment 2 is illustrated with a groove 5′ therein for receiving a commutator band 7′. In this alternative embodiment of the invention, a coating 9′ of flexible, thermally stable dielectric material such as that described in detail above relative to the embodiment of the invention shown in FIG. 2, is used to cover the entire radially outer surface of the banding 7′. Accordingly, in this form of the invention, it will be understood that even if cracks or fissures form between the banding 7′ and the coating 9′, no electrically conducted contaminants can enter into such fissures because of the sealing effect of the coating 9′. Also in this form of the invention, the coating material 9′ is of substantially uniform thickness and includes an integral portion that covers the bottom wall of the groove 5′ thereby to completely surround the banding 7 with the coating material. The flexible nature of the coating 9′ also prevents the formation of cracks or fissures between the conductive segments 2 and the abutting areas of the coating.

Figure 4:
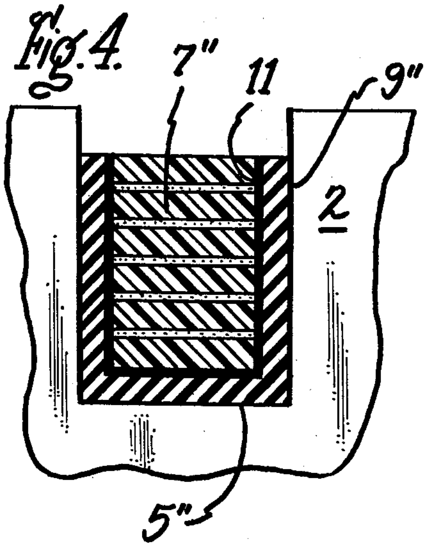
FIG. 4 is yet another side elevation of a fragment of a further modified form of the commutator shown in FIG. 1, depicting still another version of the improved commutator structure of the invention.

In FIG. 4 there is shown yet another modification of the invention wherein a conductive commutator segment 2 including a band receiving groove 5″ for housing a commutator securing banding 7″ is covered with a coating material 9″ that is disposed in the groove 5′ so that it covers the radially outermost parts of the side edges of the banding 7″ but does not cover the entire outer surface of the banding. The characteristic feature of this embodiment is that the coating 9″ includes a layer of non-adhesive release material 11 on its inner surface between it and the banding 7″. The layer of release material 11 is operable to pull away from the banding 7″ responsive to thermocycling of the banding or to other causes of relative movement between the banding and the commutator segments. Due to this release effect such movement of the banding is prevented from pulling the coating material 9″ away from the commutator segments 2 during operation of the commutator.

In this preferred modification of the invention, the layer of release material 11 comprises a flexible sheet of fluorocarbon insulating material such as Teflon sheets that are commercially available from DuPont Co. In order to enable the layer of release material to function in the desired manner described above, one of its sides is etched and is covered with a coating material comprising a cycloaliphatic epoxy adhesive to adhere the etched side of the layer of release material to the coating 9″ on the commutator segments 2 in order to prevent contaminants from collecting between the release material and those segments. Consequently, if relative movement subsequently occurs between the banding 7″ and the commutator segments 2, any resultant cracks or fissures between those members are likely to be formed between the layer of release material and the banding. Accordingly, if conductive contaminants are deposited in such cracks or fissures, they will not cause electrical tracking or arcing between adjacent commutator segments, because the deposits of conductive contaminants will still be insulated from the commutator segments by the coating 9″.

Another form of the release layer modification of the invention has been successfully tested by replacing the Teflon sheets 11 of the embodiment shown in FIG. 4 with a layer of colloidal fluorocarbon polymer on the coating 9″, without using any adhesive between the layers of release agent and the coating. Further modifications of the release layer forms of the invention will be apparent to those skilled in the art.

Figure 5:
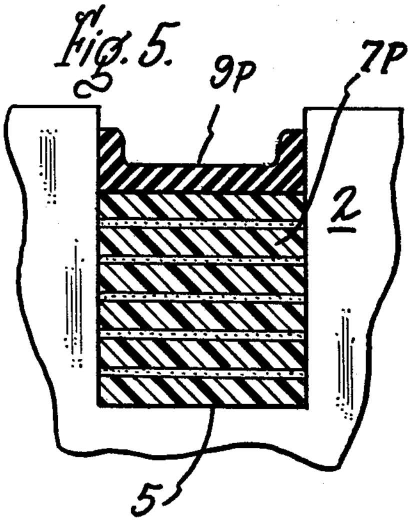
FIG. 5 is a side elevation of a cross-section of a preferred embodiment of the invention showing a sealing coating applied over the entire radially outermost surface of a commutator band and over the junctions of the top sides of band with the commutator.

Finally, there is shown in FIG. 5 a form of the invention that we presently find most preferable for use in the manufacture of medium size DC motors and generators. As can be seen in FIG. 5, in that form of the invention a banding groove 5 in commutator segments has mounted directly in it a banding 7P so that the banding is not insulated from the commutator segments by a separate coating on the side walls and bottom of the groove. A coating 9P of flexible, thermally stable dielectric material, such as that described for use in the embodiment of FIG. 2, is applied over the entire radially outermost surface of the banding 7P and over the sides of the groove 5 abutting the edges of that radially outer banding surface. Thus, contaminants are prevented from collecting in the interstices between the banding 7P and the walls of groove 5 thereby to achieve the above-noted objectives of the invention.

Now that the most preferred commutator structures of the invention have been described, the preferred method steps of the invention will be explained to assure that the application and function of the invention is fully understood. According to the most preferred method of making a commutator structure according to the invention, the following method steps are employed: First, a plurality of commutator conductor segments are mounted on a conventional hub or shaft member to form the segments in a cylindrical array and to position the segments in insulating relationship to one another and to such a hub member. Next, at least one annular groove is provided in the outer cylindrical surface of the commutator segments for receiving, respectively therein, glass commutator bandings.

The side walls of the respective grooves are then coated with a solution of room temperature curable, flexible, thermally stable and electrical-track-resistant material. After allowing the coating material to cure, commutator banding is positioned in the respective grooves against the coating material and additional coating material is applied over the radially outermost edges of the commutator bandings to completely seal the junction between the edges of each of the bands and the adjacent commutator segments. The sealing is effective to protect the junctions of the bandings and the commutator conductor segments against deposits of electrically conductive contaminants, such as a carbon dust, therein.

In an alternative method of the invention, the foregoing methods steps can be supplemented by including a step of covering the entire radially outer surface of each commutator banding with the flexible coating material thereby to further seal the bandings against deposits or accumulations of electrically conductive contaminants on the outer surfaces thereof. Still another modification of the most preferred method of the invention can be made by including yet another method step wherein a layer of release material is provided having one etched side that is positioned against the coating material in the respective banding-receiving grooves of the commutator. The etched side of the layer of release material is bonded to the coating material with a suitable glue, such as cycloaliphatic epoxy resin, thereby positioning it between the coating material and the commutator banding when the banding is mounted in the grooves. Accordingly, during thermal cycling of the banding the layer of release material is operable to pull away from the banding to produce cracks or fissures between it and the banding, rather than allowing movement of the banding relative to the segments to produce fissures between the coating of flexible material and the respective commutator segments.

The most preferred method of the invention, which is used to make an assembly such as that shown in FIG. 5, includes the following coating steps, assuming a grooved commutator is first provided with commutator bandings wound directly into the grooves: Resin is removed from the sides of the banding grooves above the bands and the radially outer surfaces of the bands are stoned to free them of foreign particles and surface irregularities. The top edges of the banding grooves and the commutator surface on which brushes are adapted to ride are masked with tape so that in the following coating step the upper edges of the coating will be kept far enough from the commutator brush surface to avoid tearing the coating during an undercutting operation of the commutator. The predetermined portion of the upper side surface of the respective banding grooves that are left unmasked should be like the areas shown in FIG. 5, on which the upward projecting sides of the coating 9P are adhered. Next, a medium thick film of coating compound, such as the Viton compound mentioned above, or the generic fluoroelastomer gum compound described in the following paragraph, is brushed onto the radially outermost surface of each commutator band and onto the resin-free sides of the band grooves adjacent those outer surfaces of the bands. After the coating has partially cured, for at least ten minutes, remove the masking tape from the top sides of the banding grooves, pulling the tapes toward the groove at an angle of about 45 degrees to avoid tearing the edges of the coating from the groove sides. Allow the coating to fully cure, then trim away any jagged edges of the coating with a sharp knife to a point where the coating is firmly adhered to the commutator.

In practicing the preferred method of the invention one can include a step of compounding a solution of room temperature curable fluoroelastomer coating material consisting essentially of the following parts by weight:

| | |
|---|---|
| fluoroelastomer gum | 100 |
| magnesium oxide | 15 |
| triethylene tetramine | 1 |
| methyl ethyl ketone | 348. |

As mentioned above in describing the preferred structure of the invention, it will be recognized that various pigment and leveling agents may also be included in the compounding solution for the coating material used in practicing the method of the invention, without departing from the true spirit or scope of the invention.

From the foregoing description of the invention those skilled in the art will recognize that various additional modifications and alternative forms of the invention may be developed from the teaching of it presented herein; accordingly, it is our intention to encompass within the limits of the following claims the true scope of the invention.

We claim:

1. A dynamoelectric machine commutator structure comprising a plurality of commutator conductive segments mounted in a cylindric array on a supporting hub member, said commutator segments being electrically insulated from one another and from said hub member, at least one annular groove defined in the outer surface of said array of commutator segments for receiving a commutator banding therein, a commutator banding mounted in said groove to apply a radially inward force to the commutator segments, and the improvement comprising a coating of flexible, thermally stable and electrical track resistant material mounted on and adhered to a predetermined upper portion of the side walls of said groove and at least the edge part of the radially outer surface of said banding to completely seal the junction between the radially outer edge surface of the banding and the commutator segments thereby to prevent electrically conductive contaminants from collecting in that junction and causing electrical tracking between the commutator segments.

2. An invention as defined in claim 1 wherein said coating of material includes an integral portion covering the entire radially outermost surface of the banding.

3. An invention as defined in claim 1 wherein said coating of material is of a substantially uniform thickness and includes an integral portion covering the bottom wall of said groove thereby to completely surround with the coating material the surfaces of the banding juxtaposed with the sides and bottom of the groove.

4. An invention as defined in claim 1 wherein said coating material is a room temperature curable fluoroelastomer compound consisting essentially of 100 parts by weight fluoroelastomer gum, 15 pbw magnesium oxide, 1 pbw triethylene tetramine and 348 pbw methyl ethyl ketone.

5. An invention as defined in claim 1 wherein said coating material also covers the entire outer surface of said banding.

6. An invention as defined in claim 1 wherein said coating material covers the radially outer edges of said banding but does not cover the entire outer surface of the banding, and including a layer of non-adhesive release material on the surface of said coating material closest to the banding, said layer of release material being operable to pull away from the banding to prevent the banding from pulling the coating material from the commutator segments, responsive to thermal cycling of the banding thereby obviating the formation of a contaminant collecting crack at the junction between the coating and said segments.

7. An invention as defined in claim 6 wherein said layer of release material comprises a flexible sheet of fluorocarbon insulating material having one etched side that is covered with said coating material, comprising a cycloaliphatic epoxy adhesive, to adhere said etched side to the commutator segments and prevent the formation of contaminant-collecting fissures between the layer of release material and said segments.

* * * * *